United States Patent
Zhao et al.

(10) Patent No.: US 11,381,865 B2
(45) Date of Patent: Jul. 5, 2022

(54) MEDIA CONTENT PRESENTATION SYSTEMS

(71) Applicant: DTEN Inc., San Jose, CA (US)

(72) Inventors: Haiqin Zhao, Xi'An (CN); Wei Liu, San Jose, CA (US)

(73) Assignee: DTEN Inc., San Jose, CA (US)

( * ) Notice: Subject to any disclaimer, the term of this patent is extended or adjusted under 35 U.S.C. 154(b) by 0 days.

(21) Appl. No.: 16/219,917

(22) Filed: Dec. 13, 2018

(65) Prior Publication Data

US 2019/0182529 A1    Jun. 13, 2019

Related U.S. Application Data

(60) Provisional application No. 62/598,380, filed on Dec. 13, 2017.

(51) Int. Cl.
| | |
|---|---|
| *H04N 21/41* | (2011.01) |
| *H04N 21/418* | (2011.01) |
| *H04N 21/422* | (2011.01) |
| *H04N 21/4367* | (2011.01) |
| *H04N 21/443* | (2011.01) |
| *H04N 21/462* | (2011.01) |
| *H04N 21/218* | (2011.01) |
| *H04N 21/4363* | (2011.01) |
| *H04N 21/4402* | (2011.01) |

(52) U.S. Cl.
CPC ....... *H04N 21/4184* (2013.01); *H04N 21/218* (2013.01); *H04N 21/43637* (2013.01); *H04N 21/440218* (2013.01); *H04N 21/4622* (2013.01)

(58) Field of Classification Search
None
See application file for complete search history.

(56) References Cited

U.S. PATENT DOCUMENTS

| | | | | |
|---|---|---|---|---|
| 2004/0148632 | A1* | 7/2004 | Park .............. | H04N 21/4131 725/81 |
| 2005/0036509 | A1* | 2/2005 | Acharya .......... | H04N 21/4753 370/467 |
| 2006/0209890 | A1* | 9/2006 | MacMullan ...... | H04W 92/00 370/468 |
| 2010/0104002 | A1* | 4/2010 | Kreiner ........... | H04N 7/1675 375/240.01 |
| 2013/0326095 | A1* | 12/2013 | Edney ............. | G06F 9/4413 710/38 |
| 2014/0082227 | A1* | 3/2014 | Beel ................ | H04N 7/15 710/11 |
| 2014/0201400 | A1* | 7/2014 | Beel ................ | G06F 13/102 710/63 |

* cited by examiner

*Primary Examiner* — Brian T Pendleton
*Assistant Examiner* — Jean D Saint Cyr
(74) *Attorney, Agent, or Firm* — Fenwick & West LLP

(57) ABSTRACT

A media content presentation system extends other devices' capability of sharing media content via a presentation device. A computing device, if coupled to a plug-in device of the media content presentation system, can present media content via the presentation device. The computing device provides the media content to the plug-in device via a proprietary communication channel established by the plug-in device. The plug-in device then passes the media content to the display device for presentation. The display device receives user input and provides the user input to the computing device for adjustment of the media content according to the user input.

9 Claims, 2 Drawing Sheets

MEDIA CONTENT PRESENTATION SYSTEMS

CROSS-REFERENCE TO RELATED APPLICATIONS

This application claims the benefit of U.S. Application No. 62/598,380, filed Dec. 13, 2017, which is incorporated by reference in its entirety.

BACKGROUND

1. Technical Field

The present invention generally relates to media content presentation, and more specially relates to extending a computing system's functionality to present media content on another device.

2. Background Information

Media content sharing is practical and important in in study and work collaboration. However, conventional media content sharing systems often face the challenges of limited data transmission speeds and device compatibility. In addition, the shared media content data is typically in a format that requires further processing which hinders users experience. The processing circuit is typically costly and takes up space.

DETAILED DESCRIPTION

Various aspects of the invention relate to a media content presentation system and components thereof and related technology. The figures and the following description relate to example embodiments by way of illustration only. It should be noted that from the following discussion, alternative embodiments of the structures and methods disclosed herein will be readily recognized as viable alternatives that may be employed without departing from the principles of what is claimed.

Figure 1:
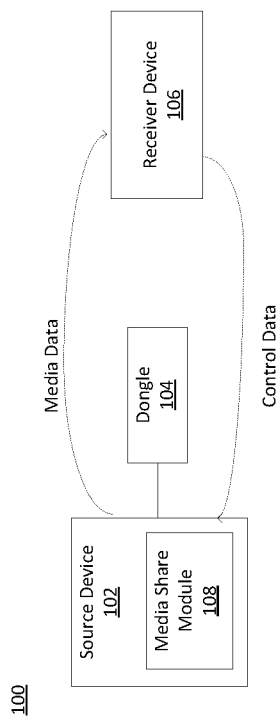
FIG. 1 illustrates an example environment 100 in which an example media presentation system operates, according to one embodiment.

FIG. 1 illustrates an example environment 100 in which an example media presentation system operates. The media presentation system includes at least the dongle 104. The receiver device 106 may be a part of the media presentation system. The source device 102, dongle 104, and receiver device 106 are located in one physical area such as a room. Multiple source devices 102, dongles 104, and receiver devices 106 can be located in the physical area. One or more source devices 102 can each be coupled to a dongle 104 thereby to present media such as audio data, image data, and/or video data on the receiver device 106. The dongle 104 is separate from and can be coupled to a source device 102. As one example, the dongle 104 is physically connected to the source device 102, via a USB port. When coupled to the source device 102, the dongle 104 provides the source device 102 with additional functionalities such as presenting media content via the receiver device 106. The media content includes audio, video, and/or image content presented via a display or a speaker. As one example, the source device 120 shares the media content (e.g., video or image) presented on its screen with the receiver device 106 such that the media content being presented to the user on the display of the source device 102 is also presented via the receiver device 106 to other users in the environment 100. Additionally, audio content (e.g., music accompanying the video data) presented via the source device 102 is also presented via the receiver device 106.

Media Data Flow

The source device 102 provides media content for presentation via the receiver device 106. Media data including the media content is provided from the source device 102 to the receiver device 106 via the dongle 104. The source device 102 is a computing device such as a laptop, a tablet, a smart phone, or a desktop. Specifically, the source device 102 includes a media share module 108 that interfaces with the dongle 104 to provide media content for presentation via the receiver device 106. In some embodiments, the media share module 108 includes a proprietary program that is installed on the source device 102 for interfacing with the dongle 104. This proprietary program is installed on the source device 102 the first time when the dongle 104 is coupled to the source device 102, if the source device 102 has not been installed with the proprietary program. The media share module 108 obtains media data and provides the obtained media data to the dongle 104. For example, the media share module 108 obtains video by screen scraping video or image being displayed on a display of the source device 102. The media share module 108 obtains the video or image from the memory of the source device 102.

The media share module 108 encodes the captured video or image data and provides encoded video or image data to the dongle 104. For example, the encoded video or image data is sent to the dongle 104 via a proprietary communication channel established by a proprietary driver. In some embodiments, the dongle 104 emulates a network interface controller to the source device 102. The encoded video or image data is processed into Ethernet frames according to one or more Transmission Control Protocol/Internet Protocol (TCP/IP) protocols. An Ethernet frame is a data link layer protocol data unit. The proprietary driver processes the Ethernet frames including the encoded video or image data into USB packets, which are further transmitted to the dongle 104. The media share module 108 obtains audio data from a sound card of the source device 102 and provides the audio data to the dongle 104. In some embodiments, the audio data includes analog sound signals converted from digital data. The media share module 108 provides the audio data similar to the provision of the video data as described above.

The dongle 104 receives media data from the source device 102 and provides the received media data to the receiver device 106. The dongle 104 is communicatively coupled to the source device 102 and coupled to the receiver device 106. As such, the dongle 104 receives media data from the source device 102 via one communication channel and provides the received media data to the receiver device 106 via another communication channel. A module such as a network interface controller included in the dongle 104 transmits data link layer packets to the receiver device 106, for example, via WiFi, as further described below. At a time point, one or more dongles 104 can provide media data to the receiver device 106 for presentation. When multiple source devices 102 use multiple dongles 104 to present media content on the receiver device 106, media content presented on the multiple source devices 102 can be presented on the receiver device 106 concurrently.

The dongle 104 receives the media data from the source device 102 over a data communication channel according to a communication protocol. The data communication channel is established over a wired or a wireless connection between the source device 102 and the dongle 104. For example, the dongle 104 includes a Universal Serial Bus (USB) port to enable the dongle 104 coupled to the source device 102. The dongle 104 receives media data from the source device 102 over the proprietary communication channel according to one or more protocols defined by USB. The proprietary communication channel is established by the proprietary driver. For example, the dongle 104 receives USB packets including the media data. Within the dongle 104, the received USB packets are processed into link layer packets including the media data. The dongle 104 transmits the link layer packets to the receiver device 106, for example, via a network.

The dongle 104 provides the media data to the receiver device 106 over another data communication channel according to a communication protocol. This data communication channel is typically established over a wireless connection between the dongle 104 and the receiver device 106. For example, as further described below, the dongle 104 includes a module that couples to a software enabled access point established by the receiver device 106. In some embodiments, when the dongle 104 is coupled to the source device 102, the dongle 104 is triggered to couple to the receiver device 106. If the software enabled access point requires a password, the dongle 104 stores the password and uses the stored password to couple to the receiver device 106. The source device 102 is triggered to transfer the media data to the dongle 104 responsive to that the connection is established.

Control Data Flow

The receiver device 106 receives control data from one or more user input devices. The control data includes instructions to adjust the media content according to the user input. The source devices 102 executes the instructions. The control data can include one or more types of control data corresponding to different user input devices. Control data of a particular type includes one or more instructions received from a user interface device. For example, the control data includes keyboard control data, mouse control data, touchpad control data, and the like. The keyboard control data includes instructions received from a keyboard. The mouse control data includes instructions received from a mouse. The touchpad control data includes instructions received from a touchpad. The control data is provided to the source device 102 for execution.

The control data is provided from the receiver device 106 to the source device 102 in a variety of ways. As one example, the receiver device 106 transmits the control data to the dongle 104 which further provides the control data to the source device 102. The dongle processes the received control data and separates the control data according to their types. That is, control data of one type corresponding to one device is separated from control of another type corresponding to another device. The dongle 104 provides the different types of control data to the source device 102 separately. To provide the different types of control data, the dongle 104 can emulate different types of user input device. For example, the dongle 104 provides the keyboard control data to the source device 104 by emulating a keyboard, provides the mouse control data to the source device by emulating a mouse, provides the touchpad control data to the source device by emulating a touchpad.

As another example, the receiver device 106 transmits the control data to the source device 102, specifically, to a proprietary program installed on the source device 102. The proprietary program separates the control data according to their types. The proprietary program provides the different types of control data to the operating system for further processing. In some situations, the source device 102 is installed with a security software that prevents the proprietary program from providing control data to the operating system. In some situations, the provision of control data is prevented by privileges.

As a further example, the receiver device 106 transmits the control data to the source device 102, specifically, to a proprietary program installed on the source device 102. The proprietary program separates the control data according to their types. The source device 102 transfers the different types of control data to the dongle 104, similar to the source device 102 transferring the media data to the dongle 104 described previously. The dongle 104 provides the different types of control data to the source device 102 separately by emulating different types of devices as described above.

The source device 102 receives control data and executes instructions included in the control data. In particular, the proprietary program installed on the source device 102 converts the received control data into commands corresponding to the instructions to cause the source device 102 to adjust the media content to be displayed corresponding to the instructions issued to the receiver device 106.

The dongle 104 includes a multipoint control unit that emulates different types of devices to the source device 102. This way, the source device 102 interfaces with the dongle 104 in a variety of ways by sending different types of data to the dongle 104 during operation. For example, the dongle 104 emulates a memory device, a sound card, and/or a network card to the source device 102.

In some embodiments, the dongle 104 and/or the source device 102 are initialized when the dongle 104 is coupled to the source device 102. The first time when the dongle 104 is coupled to a source device 102, the source device 102 detects a read-only memory (e.g., a CD-ROM), a sound card, and an unknown device. The source device 102 powers the dongle 104, which communicatively couples to a software enabled access point established by the receiver device 106 thereby to communicatively couple to the receiver device 106. The dongle 104 stores a configuration file that configures the dongle 104 to access the software enabled access point. The dongle 104 further stores the password for accessing the software enabled access point.

The read-only memory stores an installer, if activated by a user, triggers the source device 102 to download and install a driver for the unknown device such that the source device 102 can recognize and communicate with the dongle 104 via a proprietary communication channel. As such, the source device 102 can interact with the dongle 104 when the dongle 104 emulates a network card. For example, the source device 102 provides the media data to the dongle 104 (e.g., a network interface controller included in the dongle 104) and receives the control data from the dongle 104. After the source device 102 establishes a connection with the dongle 104 and the dongle 104 establishes a connection with the receiver device 106, the source device 102 is triggered to download and to install a program for capturing and transmitting media data.

The receiver device 106 decodes the received media data and provides media content included in the media data for display to users. The receiver device 106 includes a decoding module that decodes the received video data. In some embodiments, the receiver device 106 includes a display that presents the video content to users. In some embodiments, the receiver device 106 provides the received media content to a separate display for display. An example receiver device 106 includes an electronic display, a projector, a set-up box, and the like.

The receiver device 106 receives instructions from users and generates control data responsive to the received instructions. The receiver device 106 provides the control data to the dongle 104 or to the source device 102.

Figure 2:
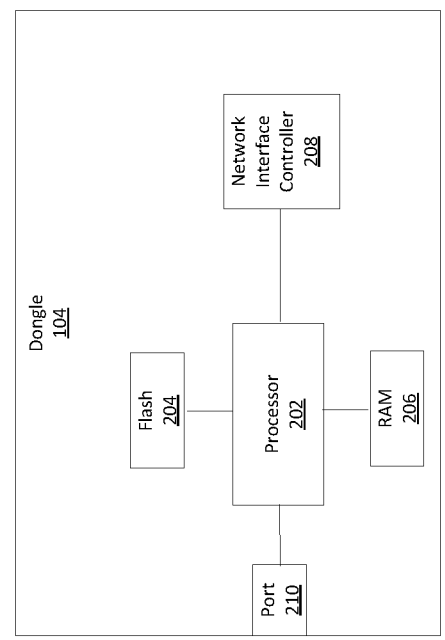
FIG. 2 illustrates an example media presentation device, according to one embodiment.

FIG. 2 is a block diagram illustrating an example dongle, according to one embodiment. The dongle 104 includes a processor 202, a flash 204, a RAM 206, a network interface controller 208, and a port 210. The port 210 is for coupling the dongle 104 to a source device 102. In some embodiments, the port 210 is a USB port. The flash 204 stores various files such as the configuration file, a password for communicatively coupling to the receiver device 106, and/or the operating system for the dongle 104. When coupled to a source device 102, the source device 102 detects the flash 204 and the dongle 104 appears to be a read-only memory to the source device 102. If the dongle 104 is powered, the operating system that is stored in the flash 204 is loaded into the RAM 206. The processor 202 processes data such as media data and control data, and provides the processed data to the network interface controller 208 or the source device 102. For example, the processor 202 converts USB packets to data link packets, or vice versa. The data is received from the source device 102 or from the network interface controller 208. The network interface controller 208 interfaces with a network such as an access point established by the receiver device 106 thereby to enable the dongle 104 to interact with the receiver device 106.

The dongle 104 may further include user interface components (not shown) such as a button, a control panel, a display panel, or a light source. The user interface components enable users to provide instructions to the dongle 104 and also to present information to users. For example, by pressing a button on a particular dongle 104, a user can activate this particular dongle 104 to interact with the receiver 106, among a plurality of dongles. That is, the particular source device 102 that is coupled to the particular dongle 104 shares media content with the receiver device 106 among a plurality of source devices that are coupled to the particular dongles. The other source devices cannot share media content with the receiver device 106 unless being activated. Activation of another dongle automatically deactivates this particular dongle 104. A status of the dongle 104 is communicated to users via the user interface components. For example, different colors of light or via different texts or graphics are used to indicate to the user whether the dongle 104 is activated. The processor 202 receives control data including instructions from the user control components, processes the control data, and provides the control data to the source device 102. Responsive to the control data, the proprietary program installed on the source device 102 operates or pauses operating. In addition, the processor 202 detects an operation state of the dongle 104 and controls user interface components to display corresponding information. For example, if the processor 202 determines that the dongle 104 receives media data from the source device 102 and provides the media data to the receiver device 106, the processor 202 triggers a user interface component to display an indication that the dongle 104 is operating. If the processor 202 determines that the dongle 104 is not receiving media data from the source device 102 or is not providing the media data to the receiver device 105, the processor 202 triggers a user interface component to display an indication that the dongle 104 is not operating or is malfunctioning. The indication can be a text message or a particular colored light.

The RAM 206 can be optional. In this implementation, the dongle 104 does not have an operating system. When coupled to the source device 102, the processor 202 functions as a hub such that the flash 204 and the network interface controller 208 are peripheral devices of the source device 102.

Figure 3:
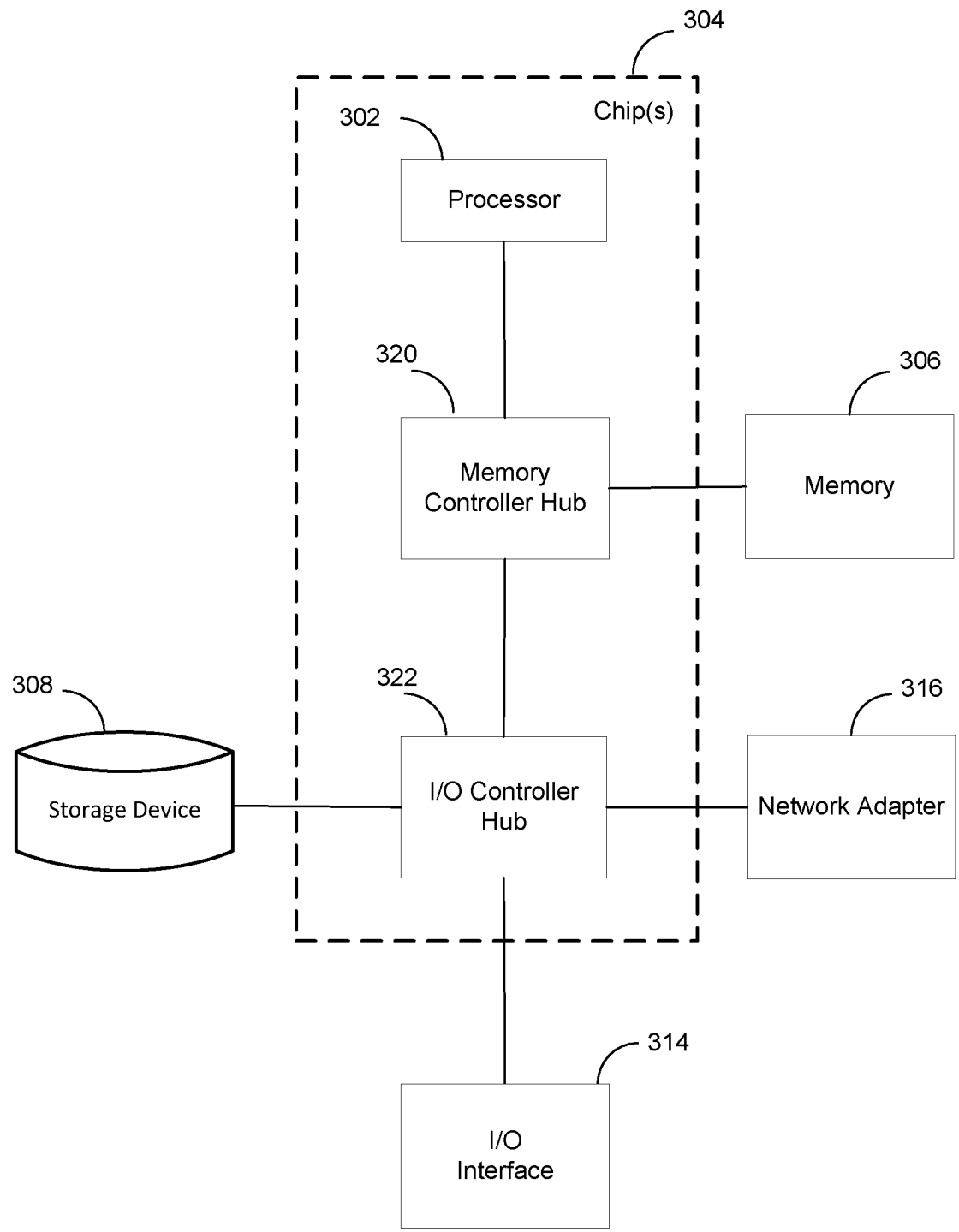
FIG. 3 is a high-level block diagram illustrating an example device for implementing the components shown in FIG. 1.

FIG. 3 is a high-level block diagram illustrating an example device 300 for implementing the components shown in FIG. 1. The device 300 includes a chip/chipset 304 that includes at least one processor 302, a memory controller hub 320 and an input/output (I/O) controller hub 322. A memory 306 is coupled to the memory controller hub 320. A storage device 308, an I/O interface 314 and a network adapter 316 are coupled to the I/O controller hub 322. Other embodiments of the device 300 have different architectures.

The storage device 308 is a non-transitory computer-readable storage medium such as a hard drive, compact disk read-only memory (CD-ROM), DVD, or a solid-state memory device. The memory 306 holds instructions and data used by the processor 302. The I/O interface 314 can support devices such as a microphone, a touch-screen interface, a mouse, track ball, or other type of pointing device, a keyboard, or some combination thereof, and is used to input data into the device 300. In some embodiments, the device 300 may be configured to receive input (e.g., commands) from the I/O interface 314 via gestures from the user. The I/O interface can also support output, such as displays and speakers. The network adapter 316 couples the device 300 to one or more computer networks.

The device 300 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 308, loaded into the memory 306, and executed by the processor 302.

The types of devices 300 used by the entities of FIG. 1 can vary depending upon the embodiment and the processing power required by the entity.

While particular embodiments and applications of the present disclosure have been illustrated and described, it is to be understood that the embodiments are not limited to the precise construction and components disclosed herein and that various modifications, changes and variations may be made in the arrangement, operation and details of the method and apparatus of the present disclosure disclosed herein without departing from the spirit and scope of the disclosure. For example, the dongle 104 may be implemented as part of the source device 102, rather than as a separate component.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

The term "module" is not meant to be limited to a specific physical form. Depending on the specific application, modules can be implemented as hardware, firmware, software, and/or combinations of these. In the example screen-sharing system described above, the modules were implemented as software, typically running on digital signal processors or even general-purpose processors. In other applications, the modules can be implemented as dedicated circuitry (e.g., part of an ASIC), in order to take advantage of lower power consumption and higher speed. Various combinations can also be used. These may be combined with customized implementations of the remainder of a screen-sharing system. Furthermore, different modules can share common components or even be implemented by the same components. There may or may not be a clear boundary between different modules.

A screen-sharing system can comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although the example screen-sharing system as shown in FIG. 1 has a limited number of elements in a certain topology, it may be appreciated that other embodiments of a screen-sharing system may include more or less elements in alternate topologies as desired for a given implementation. The embodiments are not limited in this context.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" or "coupled" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. A media content presentation system, comprising a first device comprising a processor and memory storing instructions that are configured to cause the processor to:
    establish a USB first communication channel with a source device according to a first communication protocol;
    establish a wireless second communication channel with a receiver device according to a second communication protocol, by coupling to a software enabled access point established by the receiver device;
    cause the source device to install a program responsive to determining that the first device is coupled to the source device, wherein the first device comprises a USB port configured to couple to the source device, the program causing the source device to obtain media content data by screen scraping the media content data from a memory of the source device;
    receive first data packets according to the first communication protocol including media content data from the source device via the first communication channel; and
    process the first data packets into second data packets according to the second communication protocol;
    provide second data packets including the media content data to the receiver device via the second communication channel, for presentation by the receiver device;
    receive control data originated from a plurality of input devices for adjusting playback of media content associated with the media content data, wherein the control data comprises a plurality of input types;
    identify each input type of the plurality of input types associated with the control data;
    separate the control data from the plurality of input devices according to the plurality of input types;
    emulate, to the source device, the plurality of input devices corresponding to the plurality of input types; and
    provide the control data to the source device according to emulation of the plurality of input devices.

2. The media content presentation system of claim 1, wherein the instructions are configured to cause the first device to emulate a network interface controller to the source device.

3. The media content presentation system of claim 1, wherein the instructions are further configured to cause the source device to provide the media content data to the first device.

4. The media content presentation system of claim 1, wherein the instructions are further configured to cause the source device to obtain the media content data from a sound card of the source device.

5. The media content presentation system of claim 1, wherein the instructions are further configured to cause the source device to obtain an installer of the program from the receiver device.

6. The media content presentation system of claim 1, further comprising the receiver device configured to present media content included in the media content data.

7. The media content presentation system of claim 6, wherein the receiver device is further configured to:
   receive user instructions from a plurality of input devices, wherein user instructions include the plurality of input types;
   combine the user instructions into the control data; and
   provide the control data including the user instructions to the source device to trigger the source device to execute the user instructions.

8. The media content presentation system of claim 6, wherein the receiver device is further configured to:
   receive control data including user instructions from a user device, and
   provide the control data including the user instructions to the first device; and
   wherein the instructions stored in the memory of the first device are further configured to cause the processor of the first device to provide the control data to the source device to trigger the source device to execute the user instructions by emulating the user device.

9. The media content presentation system of claim 6, wherein the receiver device is further configured to:
   receive control data including user instructions from a user device, and
   provide the control data including the user instructions to the source device to trigger the source device to provide the control data to the first device; and
   wherein the instructions stored in the memory of the first device are further configured to cause the processor to provide the control data to the source device to trigger the source device to execute the user instructions by emulating the user device.

* * * * *